United States Patent [19]
Adams

[11] 3,765,689
[45] Oct. 16, 1973

[54] MECHANICAL SEAL CONSTRUCTION
[75] Inventor: William V. Adams, Portage, Mich.
[73] Assignee: Durametallic Corporation, Kalamazoo, Mich.
[22] Filed: Sept. 27, 1971
[21] Appl. No.: 183,955

[52] U.S. Cl. .................. 277/26, 277/81, 277/93, 277/91
[51] Int. Cl. ............................................ F16j 15/38
[58] Field of Search .............. 277/26, 81, 93, 91, 277/41

[56] References Cited
UNITED STATES PATENTS

| 2,995,390 | 8/1961 | Gardner | 277/26 |
| 1,224,239 | 5/1917 | Underwood | 277/26 |
| 3,420,535 | 1/1969 | Hershey | 277/93 X |
| 3,356,378 | 12/1967 | Tracy | 277/81 X |
| 3,015,504 | 1/1962 | Fulton et al. | 277/26 |

Primary Examiner—Samuel B. Rothberg
Attorney—Woodhams, Blanchard et al.

[57] ABSTRACT

A mechanical seal construction having an annular face ring, preferably of such a material as tungsten carbide, interference-fitted within an annular flange formed on a seal ring. One of the face ring and seal ring is undercut so that the effective holding force between the flange and the face ring, as created by the interference-fit, acts effectively only at, or at least adjacent, the central transverse plane of the face ring to substantially prevent distortion of the face ring.

8 Claims, 5 Drawing Figures

Patented Oct. 16, 1973

3,765,689

INVENTOR.
WILLIAM V. ADAMS
BY
Woodhams, Blanchard & Flynn
ATTORNEYS

MECHANICAL SEAL CONSTRUCTION

FIELD OF THE INVENTION

This invention relates to an improved mechanical seal construction and, in particular, to a mechanical seal construction employing a seal ring and a separate annular face ring connected together by an interference-fit, which interference-fit effectively occurs only across an area of engagement positioned to substantially prevent angular distortion of the face ring.

BACKGROUND OF THE INVENTION

It has been customary for many years in certain types of mechanical seal constructions to provide one of the seal faces of the mechanical seal with a so-called "face ring" which is made of a wear-resistant material, such as tungsten carbide, and which is separate from, but attached to, its associated seal ring. One important reason for using this type of construction is that the seal ring itself can be made of a less expensive and durable material and, thus, the cost of the seal can be reduced without reducing the effectiveness or durability of the seal. Also, the face ring can be replaced when it becomes worn without replacing the seal ring. In many cases, a resilient washer has been positioned between the face ring and the seal ring, and has been secured to both rings by a suitable adhesive or mechanical clamping means. The procedures for making such mechanical seals are relatively complex and expensive. In particular, it has been necessary to perform the required finish lapping operation on the face ring after it has been assembled with the seal ring and this is relatively difficult to do and often results in a surface that does not maintain flatness during storage and operation. Moreover, such constructions are not sufficiently durable because the face ring can become loosened or leak under a variety of temperature and pressure conditions. Thus, the prior mechanical seals employing a face ring mounted on a seal ring have not always been completely satisfactory and there has long existed a need for an improved mechanical seal construction provided with improved means for connecting the face ring to the seal ring.

In view of the numerous disadvantages associated with seal constructions of the above-mentioned type, numerous attempts have been made to utilize a seal construction having the face ring interference-fitted within the seal ring. However, such interference-fit seal constructions have also often proven unacceptable due to their frequent inability to withstand the severe operating conditions normally encountered. Particularly, in many use situations, the seal construction is exposed to widely varying temperatures. Since the face ring and the seal ring are of different materials having substantially different coefficients of expansion, the wide temperature range to which the seal construction may be subjected changes the magnitude of the interference-fit between the seal ring and the face ring, which in turn often results in distortion of the face ring so that the seal face thereon is no longer flat and thus may leak.

A still further problem presented by prior attempts to utilize an interference-fit relationship between the face ring and the seal ring has been the distortion of the face ring which occurs upon the creation of the interference-fit relationship. The face ring, as explained above, must have a finish lapping operation on the surface thereof to provide a true and planar seal face. This finish lapping operation is preferably performed prior to its assembly with the seal ring since such a lapping operation can then be more efficiently and precisely performed. However, when the face ring is interference-fitted into the seal ring, the interference-fit relationship imposes forces on the face ring causing angular distortion thereof. This distortion destroys the flatness of the seal face, which necessarily requires that the final lapping operation of the seal face be performed after the face ring has been fixed into the seal ring. As mentioned above, this is a more complex and difficult operation to perform. While the distortion of the face ring can be minimized by reducing the magnitude of the interference creating the interference-fit, which thus reduces the pressure between the face ring and the seal ring, nevertheless this procedure is also undesirable since it reduces the magnitude of the holding force between the seal ring and the face ring. In use situations wherein the seal ring is a driving member, the reduced holding force often permits rotational movement between the face ring and the seal ring, and thus the proper performance of the seal construction is destroyed.

Accordingly, it is an object of the present invention to provide an improved mechanical seal construction employing a face ring and a seal ring, and in which the face ring is connected to the seal ring by an interference-fit which does not cause undesirable distortion of the face ring, either during assembly or during operation of the seal construction.

A further object of this invention is to provide an improved seal construction, as aforesaid, in which the interference-fit relationship between the seal ring and the face ring creates a relatively large holding force between the face ring and the seal ring to permit the face ring to be non-rotatably connected to but rotatably driven from the seal ring.

It is a further object of this invention to provide an improved seal construction, as aforesaid, in which the interference-fit relationship between the seal ring and the face ring results in the face ring applying a radial holding force to the face ring substantially within the central transverse plane thereof to prevent imposition of distortion-causing moments on the face ring.

Still a further object of the present invention is to provide an improved seal construction, as aforesaid, wherein the seal ring has an annular flange surrounding at least a portion of the face ring, with the inner end of either the flange or the face ring being undercut so that the flange engages the face ring substantially at, but only at, the central transverse plane thereof to thus impose a holding force on the face ring substantially only at, or at least adjacent, said plane, irrespective of the deflection of the flange as caused by the interference-fit engagement of the face ring within the flange.

Another object of this invention is to provide an improved seal construction, as aforesaid, in which a desired sealing relationship can be achieved under widely varying temperature and pressure conditions without requiring the use of a further sealing gasket between the face ring and the seal ring.

Still another object of the present invention is to provide an improved seal construction, as aforesaid, in which many of the assembly steps and expensive finishing operations required with prior mechanical seal constructions of this type are unnecessary.

Additional objects and advantages of the invention will be apparent to persons acquainted with devices of this type upon reading the following description and inspecting the accompanying drawings.

Figure 1:
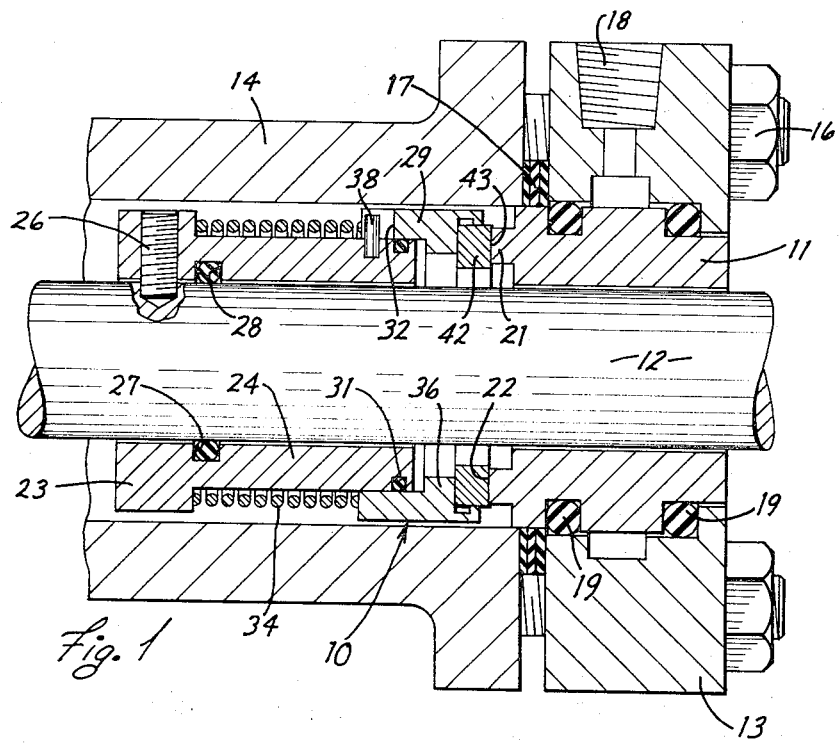
FIG. 1 is a central sectional view of a preferred embodiment of the improved mechanical seal construction to which the invention relates, same being shown in association with a rotatable shaft and a stationary housing.

Certain terminology will be used in the following description for convenience in reference only and will not be limiting. The words "upwardly," "downwardly," "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof, and words of similar import.

SUMMARY OF THE INVENTION

The objects and purposes of the invention are met by providing a mechanical seal construction for sealing a rotatable shaft with respect to a stationary wall means, such as a pump housing. The mechanical seal construction comprises a pair of annular elements surrounding the shaft and having opposed seal faces extending at right angles to the shaft. One of the annular elements is secured to the stationary wall means and the other element is mounted for rotation with the shaft. Means are provided for urging the seal faces into sealing and rotatable sliding engagement with each other. One of the elements comprises a seal ring and face ring assembly, in which the seal ring has an annular recess formed in one axial end thereof as defined by an axially extending annular flange. The face ring is disposed within the annular recess and is nonrotatably connected to and sealingly engaged with the seal ring due to an interference-fit engagement with the annular flange. One of the seal ring and annular flange, preferably the annular flange, is provided with an annular undercut or groove adjacent the rearward end of the face ring so that in this embodiment the annular flange thus engages the periphery of the face ring only in a zone substantially adjacent the central transverse plane thereof. This relationship results in the flange imposing a holding force on the face ring, as created by the interference-fit relationship therebetween, only through a zone substantially adjacent the transverse central plane of the face ring so that the holding force does not cause any substantial distortion thereof.

DETAILED DESCRIPTION

Referring to the drawing, there is shown, by way of example, a mechanical seal 10 of the "inside" type, that is, a mechanical seal in which the rotating part of the seal is inside the housing which contains the fluid under pressure. The mechanical seal 10 comprises a stationary annular element 11 which surrounds a shaft 12. In the illustrated embodiment of the invention, the annular element 11 is a gland insert which is mounted within a gland 13. The gland 13 is secured to a housing 14 by bolts 16 and suitable sealing means 17, such as gaskets, are provided between the gland 13 and the housing 14. The gland 13 has an opening 18 for supplying coolant to the external surface of the gland insert 11. A further opening (not shown) is provided in the gland 13, in a conventional fashion, to permit the coolant to exit from the gland. A pair of axially spaced O-rings 19 are provided for preventing the flow of coolant in both axial directions along the outer side of the gland insert 11. The gland insert 11 has a portion which projects into the housing 14 and the inner end of such gland insert has an annular axial projection 21 which is provided with an accurately finished radial seal surface 22. The annular element 11 can be made of any suitable material, such as carbon.

A collar 23 encircles, and is fixedly secured to, the shaft 12 by suitable means, such as one or more set screws 26. The collar 23 has an annular sleeve portion 24 projecting axially toward the annular element 11. An elastomeric O-ring 27 is disposed within a groove 28 in the internal surface of the annular portion 24 and sealingly engages the shaft 12.

An annular seal ring 29 is closely slideably telescoped on the annular portion 24 and is movable axially with respect to the shaft 12. An elastomeric O-ring 31 is disposed within a groove in the external surface of the annular portion 24 and sealingly contacts the seal ring 29. The annular seal ring 29 is also provided with an annular enlargement 36 adjacent the forward end thereof, which annular enlargement extends radially inwardly into the space between the annular portion 24 and the annular element 11.

To permit the seal ring 29 to be nonrotatably connected to the collar 23, the seal ring 29 is provided with a plurality of circumferentially spaced slots 32 extending axially into the rearward end thereof. Each of the slots 32, only one of which is shown in FIG. 1, receives therein the outer end of a drive pin 33 which is fixedly secured to the annular sleeve portion 24. A conventonal coil spring 34 surrounds the sleeve portion 24 and the opposite ends thereof engage the collar 23 and the seal ring 29. The spring 34 is normally maintained under compression so that the seal ring 29 is thus continously resiliently urged toward the annular member 11.

It will be recognized that the mechanical seal construction, as thus far described, is of a conventional, well-known type. The foregoing description of the mechanical seal construction is given for illustrative purposes only and has no limiting significance. It will be understood that the structure of the invention described hereinbelow can be applied to a wide variety of other specific mechanical seal constructions.

Considering now the improvements to which the present invention relates, the annular enlargement 36 has an annular recess 37 formed in the end thereof which faces the annular element 11. The enlargement 36 has an axially extending, generally annular projection or flange 41 surrounding and forming the sidewall of the recess 37. The flange 41 has an annular inner peripheral surface 38 defining the outer boundary of the recess 37. The recess is likewise bounded by means of a substantially transverse bottom wall 39 as formed on the enlargement 36.

An annular face ring 42 is adapted to be disposed, at least in part, within the recess 37. The face ring has opposite and substantially parallel surfaces 43 and 44. The surface 43 functions as a seal surface and is adapted to be disposed in rotatable sliding engagement with the other seal surface 22, whereas the surface 44 functions as a support surface and is adapted to abut the bottom wall 39 of the recess.

The face ring 42 is adapted to extend into the recess 37 so that the annular flange 41 thus surrounds the face ring. Further, the face ring 42 is designed to have an interference-fit relationship with the flange 41, whereby the inner peripheral wall 38 of the flange is thus disposed in snug engagement with the other annular peripheral surface 46 of the face rearward 42. The rear end of the face ring 42 can have a chamfer 47 formed on the rear corner thereof, if desired, to facilitate the interference-fit assembly.

According to the present invention, the annular flange 41 has an undercut groove 48 formed therein, which groove 48 is formed adjacent the axially inner end of the flange directly adjacent the bottom wall 39, whereupon the flange 41 thus has a substantially L-shaped cross section. The undercut groove 48 results in the formation of an annular rib 49 adjacent the axially other end of the flange 41, which rib 49 is directed radially inwardly to provide an interference-fit engagement with the outer peripheral surface 46 of the face ring 42.

Figure 2:
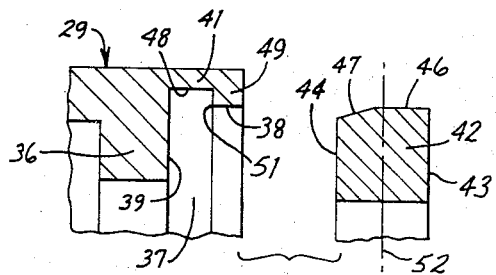
FIG. 2 is an exploded, fragmentary sectional view, taken on an enlarged scale, of the face ring and seal ring constructed according to the present invention.
Figure 3:
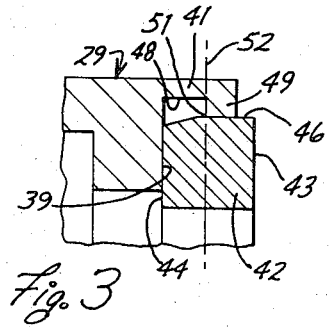
FIG. 3 is a sectional view similar to FIG. 2 but illustrating the face ring assembly within the seal ring.
Figure 4:
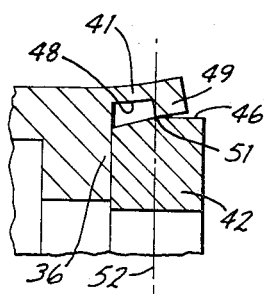
FIG. 4 is a fragmentary sectional view similar to FIG. 3 and illustrating therein in an exaggerated manner the deflection of the holding flange.

The undercut groove 48 has an axial width between about 40 percent and about 60 percent of the axial width of the face ring 42, which thus results in the innermost corner 51 of the annular rib 49 contacting the face ring surface 46 substantially within, or close to, the central or middle transverse plane of the face ring, which central transverse plane is parallel to and disposed midway between the surfaces 43 and 44, and is schematically illustrated in FIGS. 2-4 by means of the dash-dot line 52.

The maximum external diameter of the face ring 42, as defined by the peripheral surface 46, is preferably slightly greater than the diameter of the recess 37, as defined by the peripheral surface 38, the actual magnitude of such dimensions depending upon the diameters involved and the materials used and being selected in accordance with known practice to create a satisfactory interference-fit (either press- or shrink-fit) therebetween. For this purpose, in one typical instance, involving a tungsten carbide face ring 42 of 2 inch O.D. and a seal ring 29 of stainless steel, the diameter of the face ring 42 is preferably approximately 0.004 – 0.010 inch greater than the recess diameter defined by the surface 38. This interference thus requires that the face ring 42 be axially pressed into the recess 37, which thus results in a interference-fit relationship between the face ring 42 and the seal ring 29 so that the face ring is nonrotatably secured relative to the seal ring.

While the face ring 42 can be constructed of any suitable wear resistance material, it is preferably constructed of either carbon or tungsten carbide. On the other hand, the seal ring 29 is generally constructed of steel, whereupon the seal ring 29 and face ring 42 thus have substantially different coefficients of thermal expansion. The rings 29 and 42 will thus expand different amounts when the seal construction 10 is utilized in an environment subject to substantial temperature variations.

When the face ring 42 has been interference-fit into the seal ring 29 so as to assume a position substantially as illustrated in FIG. 3, the pressure relationship which exists between the surfaces 38 and 46 results in the face ring 42 imposing a radially outwardly directed force on the flange 41, which force is imposed directly onto the annular rib 49. However, since the annular flange 41 projects axially from the enlargement 36 in a cantilevered manner, the radially outwardly directed force imposed on the rib 49 tends to deflect the flange 41 outwardly about its point of connection to the enlargement 36. This outward deflection of the flange 41, which is illustrated on an enlarged and exaggerated scale in FIG. 4, results in the rib 49 substantially contacting the surface 46 at a narrow line of contact, namely at the inner corner 51. However, since the corner 51 contacts the surface 46 substantially at the central transverse plane 52, the holding forces imposed on the face ring 42 by the flange 41 are likewise substantially applied at the central plane 52. These holding forces, as generated by the interference-fit relationship, accordingly do not impose any substantial twisting moment on the face ring so that the face ring 42 is thus substantially free of distortion, even after having been interference-fitted into engagement with the seal ring 29. Further the differential thermal expansion of the seal ring 29 and the face ring 42 does not cause any substantial distortion of the face ring 42 since the flange 42 still contacts the face ring at the corner 51, which corner remains substantially within the central plane 52 regardless of the differential thermal expansion between the face ring 42 and the seal ring 29. Thus, the overall seal assembly, as illustrated in FIG. 4, is able to undergo wide temperature variations without causing any appreciable distortion of the face ring 42. In this manner the seal surface 43 remains substantially planar at all times and accordingly will provide a desirable sealing engagement with the opposite seal surface 22.

ASSEMBLY AND OPERATION

The individual components of the seal construction 10 are formed in the usual manner, and the face ring 42 can be completely finished prior to its assembly with the seal ring 29. That is, the seal surface 43 can be properly lapped prior to assembly of the face ring 42 with the seal ring 29. The face ring 42 is then interference-fitted into the recess 37 until the rear surface 44 of the face ring abuts the bottom wall 39. This interference-fitting of the face ring 42 into the recess 37 causes the annular flange 41 to be angularly deflected so that the annular rib 49 contacts the outer surface 46 substantially at the corner 51, which corner effectively contacts the surface 46 at a line of contact which substantially lies within the central plane 52. This thus results in the flange 41 imposing a substantially radially inwardly directed holding force on the face ring 42 for nonrotatably connecting the face ring to the seal ring. Further, since this holding force is substantially located within the plane 52, the holding force does not create any substantial moment tending to angularly deflect the face ring. Thus, the seal surface 43 remains substantially planar and accordingly will provide a snug rotatable and sliding sealing engagement with the opposite seal surface 22 when the seal construction 10 is resiliently urged by the spring 34 into engagement with the annular member 11.

While it will be readily recognized that the holding force imposed on the face ring 42 does not exist solely at a point-like contact disposed within the plane 52, nevertheless the holding force will exist over an area which, in the axial direction of the seal ring, is relatively small and is disposed adjacent and substantially on opposite sides of the plane 52 so that the torsional moment imposed on the seal ring, which torsional moment tends to distort the face ring, is thus substantially minimized, if not eliminated.

If it is still necessary to lap the seal surface 43 after the face ring 42 has been interference-fitted into the seal ring 29, this nevertheless still results in an improved seal contruction since the location of the holding forces substantially within the central plane 52 minimizes the distortion of the face ring 42, so that the differential thermal expansion between the face ring and the seal ring will not disrupt the proper sealing engagement between the surfaces 22 and 43.

Thus, as is readily evident from the foregoing, the construction of the present invention greatly minimizes the distortion of the face ring as caused by the interference-fitting of the face ring into the seal ring, so that in some circumstances it is possible to not perform any further lapping of the seal surface 43 after the face ring has been press-fit into the seal ring. Also, if further lapping is required, the amount of lapping required is substantially minimized since the distortion of the face ring 42 as caused by the interference-fitting operation is likewise minimized. After the interference-fitting of the face ring into the seal ring, any subsequent distortion of the face ring 42 as caused by widely varying temperatures is likewise substantially minimized, and accordingly widely varying temperatures have little effect on the proper performance of the seal construction.

Figure 5:
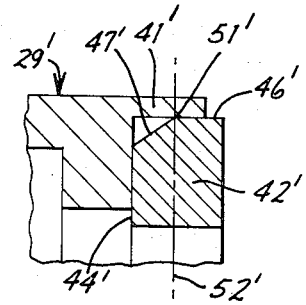
FIG. 5 is a fragmentary sectional view similar to FIG. 3 and illustrating therein a variation of the present invention.

FIG. 5 illustrates therein a variation of the present invention wherein the annular flange 41' as formed in the seal ring 29' does not have an undercut groove formed therein. Rather, in this variation of the invention, the face ring 42' is formed with a chamfer 47' on the rearward end thereof which extends from the rear surface 44' to the central plane 52'. Thus, when the face ring 42' is interference-fitted into the seal ring 29', the flange 41' will again undergo a cantilever-type deflection so that the outer surface 46' of the face ring 42' will effectively contact the inner surface of the flange 41' at a single pointlike line of contact, namely the point 51' located substantially within the central plane 52'. Thus, the holding force imposed on the face ring 42' is again located substantially within the central plane 52' so that the distortion of the face ring 42', as created by the interference-fit relationship, is substantially minimized, if not eliminated.

It will be evident that several other variations of either the flange 41 or the face ring 43 could be provided to result in the desired interference-fit relationship disclosed in this invention. For example, the annular rib 49 could be provided with an inwardly directed V-shaped configuration to thus provide a radially inner pointed edge disposed substantially within the central plane 52. Likewise, the face ring 42 could have an outwardly directed rib formed on the outer periphery thereof, which rib would be centrally located between the opposite axial ends of the face ring and could be provided with an outer pointed edge disposed substantially within the plane 52 and disposed in interference-fitted engagement with the flange 41. While variations of this type will theoretically perform according to the present invention, nevertheless such variations represent configurations which are more difficult to utilize as a practical matter, and thus, while they are encompassed within the present invention, they nevertheless do not constitute the preferred embodiment thereof.

Thus, as wil be apparent from reading the above description, the present invention thus results in the moments imposed on the face ring, which moments result in distortion of the face ring, being substantially minimized if not eliminated. This desirable coaction is achieved utilizing a interference-fit relationship acting substantially within or at the central transverse plane 52. This can be achieved by having the actual holding force located at the central plane, such as illustrated in FIG. 4, or by having a resultant or effective holding force act at the central plane. While the loading force, due to practical considerations, obviously cannot exist along a line as defined by the intersection of the plane 52 with the surface 46, nevertheless the holding force preferably acts over a narrow ringlike annular area which is of rather narrow axial width and is disposed adjacent, and preferably includes, the intersection line between the plane 52 and the annular surface 46.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. In a mechanical seal construction for sealing a shaft which is relatively rotatable with respect to a wall, said seal construction having first and second annular elements surrounding said shaft and having opposed transverse seal faces, said first element being secured to said wall and said second element being nonrotatably mounted relative to said shaft, one of said annular elements including a seal ring and a face ring nonrotatably connected to the seal ring, said face ring having one of said transverse seal faces thereon, and means for urging the seal faces into sealing and rotatable sliding engagement with each other, the improvement comprising:

holding means coacting between the seal ring and the face ring for creating an interference-fit therebetween for fixedly connecting said face ring to said seal ring, said holding means imposing a holding force on said face ring directed substantially radially inwardly relative to the face ring and effectively acting only at least adjacent the central transverse plane of the face ring so as to not impose any substantial twisting moment on the face ring to thus minimize distortion of the face ring;

said holding means including an annular axially extending flange fixedly and integrally connected to said seal ring and projecting from one end thereof and defining a substantially annular recess, said face ring being disposed within said recess with one axial end of said face ring being abutted against said seal ring and the other axial end of said face ring having said one seal face formed thereon, said flange creating an interference-fit with the annular peripheral surface of said face ring; and one of said face ring and flange having an annular groove formed therein adjacent said one end of said face ring so that the annular peripheral surface of said face ring adjacent said one end thereof is spaced from and maintained out of contact with said annular flange, said annular flange contacting and imposing a holding force on the annular peripheral surface of said face ring only at a location spaced axially from said one end of said face ring.

2. A seal construction according to claim 1, wherein said flange contacts said face ring at least adjacent a transverse plane disposed substantially midway between the planes defined by the front and rear axial surfaces of the face ring.

3. A seal construction according to claim 1, wherein said annular flange has an undercut annular groove formed in the inner periphery thereof adjacent the axially rearward end of the flange so that said undercut groove surrounds a portion of the annular periphery of said face ring adjacent said one axial end thereof.

4. A seal construction according to claim 3, wherein said undercut groove has an axial width between about 40 percent and about 60 percent of the axial width of said face ring.

5. A seal construction according to claim 3, wherein said flange is substantially L-shaped in cross section and has a radially inwardly directed annular rib disposed adjacent the free end thereof, said rib being disposed in snug engagement with the outer periphery of said face ring for fixedly connecting said face ring to said seal ring.

6. A seal construction according to claim 1, wherein said face ring has a maximum normal outer diameter greater than the minimum normal internal diameter of said annular flange to thus create an interference-fit therebetween when the face ring is fixed into the recess defined by said flange, said flange contacting said face ring only within a narrow annular ring-like area disposed substantially to include the central transverse plane of said face ring due to said flange being angularly deflected when said face ring is positioned within the recess defined by said flange.

7. A seal construction according to claim 6, wherein said face ring and said seal ring are constructed from different materials having substantially different coefficients of thermal expansion.

8. A seal construction according to claim 1, wherein said annular groove is formed on said face ring adjacent said one end thereof.

* * * * *